Figure 1:
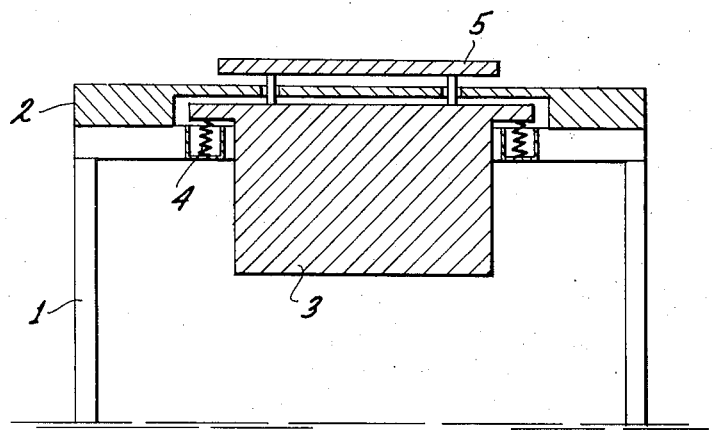

United States Patent [19]
Pielkenrood

[11] 3,808,983
[45] May 7, 1974

[54] VIBRATION SUPPRESSING TABLE
[75] Inventor: Simon Pielkenrood, Parklaan, Netherlands
[73] Assignee: Pielkenrood-Vinitex, Assendelft, Netherlands
[22] Filed: Apr. 14, 1972
[21] Appl. No.: 243,968

[30] Foreign Application Priority Data
Apr. 19, 1971 Netherlands ...................... 7105264

[52] U.S. Cl. .................................. 108/136, 248/20
[51] Int. Cl. ............................................. A47b 9/02
[58] Field of Search ...................... 108/136; 248/20

[56] References Cited
UNITED STATES PATENTS
2,289,514  7/1942  Mastney et al. ................... 108/136
2,148,937  2/1939  Gerb ................................... 248/20

FOREIGN PATENTS OR APPLICATIONS
758,884  10/1956  Great Britain ....................... 248/20
890,374  2/1962  Great Britain ....................... 248/20

Primary Examiner—Bobby R. Gay
Assistant Examiner—Kenneth J. Dorner
Attorney, Agent, or Firm—Smyth, Roston & Pavitt

[57] ABSTRACT

Vibration suppressing table, comprising a stationary base, a resiliently supported heavy mass provided with a supporting plate, a number of coil springs arranged in the corners of a polygon, the height of the bearing end of these springs being adjustable, the elastic center of these springs substantially with the center of gravity of the mass.

14 Claims, 4 Drawing Figures

PATENTED MAY 7 1974 3,808,983

VIBRATION SUPPRESSING TABLE

Equipment which is sensitive for vibration, such as, for instance, measuring instruments, special photographic equipment and the like, are to be shielded from external vibrations.

To that end many different vibration suppressing arrangements have been designed, all comprising, in principle, a support for the instruments in question with a relatively large mass, which support is resiliently mounted on a base, and, moreover, damping means for the resilient means are generally provided. All or part of the resonance frequencies of the resilient assembly are then situated outside the range of the prevalent external vibrations.

The vibrations originating from external sources, however, may be of very different character. For an effective vibration shielding the arrangement should have low resonance frequencies which should be as remote as possible from the range of prevalent external vibrations. Such a very elastic support has the disadvantage that the arrangement, in the case of equipment which is to be operated or touched during use, becomes too unstable, so that the supporting surface for such equipment does not remain horizontal during operation, which is often very objectionable, for instance in case of a scale. Moreover an arrangement with very low resonance frequencies, as soon as it is set in motion, takes a very long time before it has come to rest again.

The invention provides a vibration suppressing table not having the disadvantages of the known tables. This table has an excellent vibration and impact suppressing characteristics.

To that end the vibration suppressing table according to the invention, comprising a stationary base and a resiliently supported heavy body or mass with a supporting plate, is characterized by a number of coil springs arranged in the corners of a polygon, preferably an equilateral triangle, said springs having a bearing surface with adjustable height, the elastic centre of these springs substantially coinciding with the center of gravity of the mass.

In this manner it is ensured that all the resonance frequencies remain low, and also the rotation frequencies will not be higher than the vertical translation frequencies. Moreover, the various oscillation modes of the mass will not be mutually coupled, so that horizontal and vertical vibrations which may possibly be transmitted to this mass have no substantial influence on the horizontal position of the supporting plate.

Moreover this table may be provided with stop means for immobilizing the mass in respect of the base transversely to the vertical axis of the mass, and, more specifically, in the horizontal plane extending substantially through the elastic center of the springs and the center of gravity of the mass.

In this manner it is obtained that in the immobilized condition an apparatus supported by the plate may be operated without objection since, then, the mass will not be moved. As a consequence of the symmetrical immobilization and the favorable position of the stop points in respect of the elastic center it is obtained that the mass may be immobilized in any arbitrary position without the location or orientation of the said mass being changed, or being moved on releasing the stop means.

These stop means are preferably hydraulically operated and may be constructed as an integral unit so that temperature effects are negligible. Such a unit may be easily mounted and removed, and also the removal of air is simple.

A table according to the invention is preferably provided with frictionless viscous dampers for quickly attenuating unwanted movements. Together with the steel springs such dampers ensure a rapid return of the supporting plate towards its original position, which is very important when the apparatus in question is sensitive for deviations from the horizontal position. The damping may be adapted by an appropriate selection of the viscosity of the damping liquid.

Figure 2:
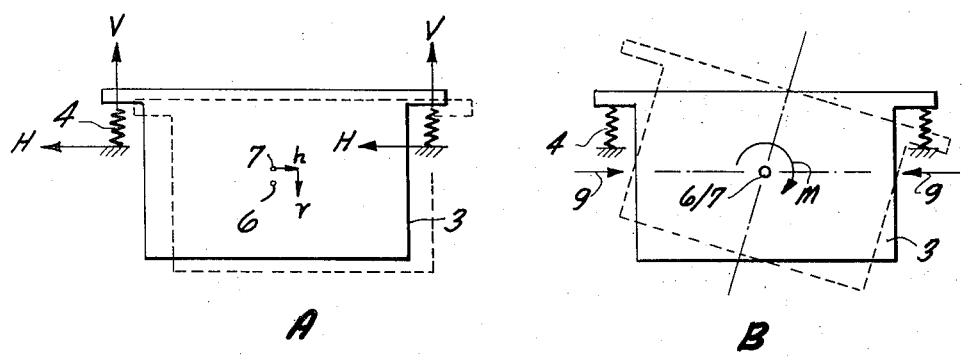
Figure 3:
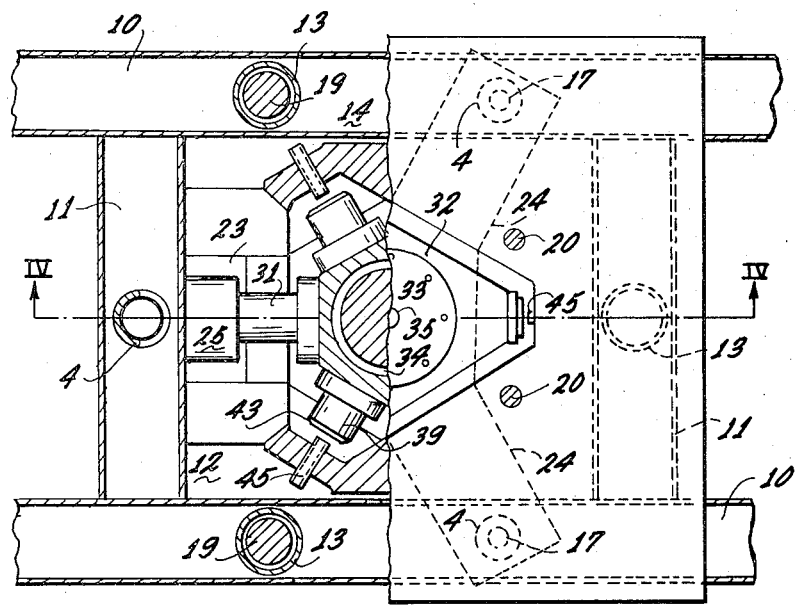
Figure 4:
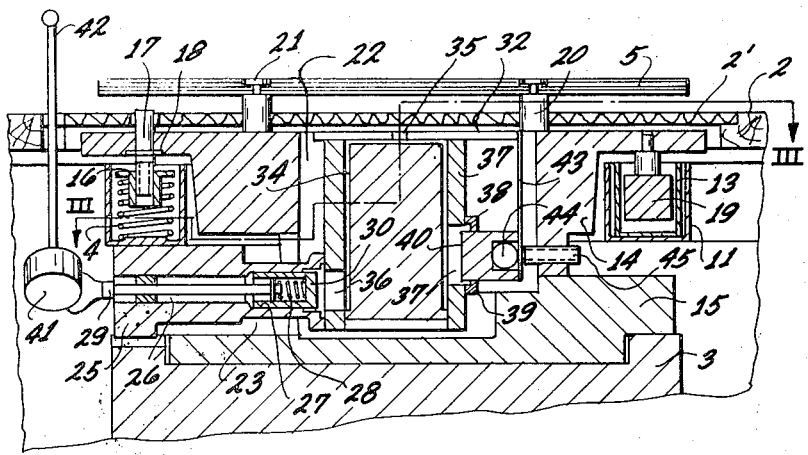

The invention will be elucidated below by reference to the following drawings, showing in:

FIG. 1, a diagrammatic section of a table according to the invention;

FIGS. 2A and B simplified representations of the mass and the springs of such a table in two different circumstances;

FIG. 3 a top plan view, partially in section on the line III—III of FIG. 4, of a part of the table of the inventions; and FIG. 4 a section on the line IV — IV of FIG. 3.

The table which is diagrammatically shown in FIG. 1 comprises a frame with legs 1 and a top surface 2. In an aperture of the latter a relatively heavy mass 3 is supported in the frame by means of springs 4, said frame forming with the legs a rigid and non-deformable unit. A supporting plate 5 is rigidly connected with the mass 3.

FIG. 2A shows a simplified representation of the mass 3 and the springs 4. This mass has a center of gravity 6 coinciding with or lying in the immediate vicinity of the elastic center 7 of the spring assembly. A horizontal or vertical vibration of the floor is transmitted to the springs, so that the base of these springs will start to vibrate in the horizontal and vertical directions with amplitudes H and V respectively. These vibrations are considerably attenuated in being transferred to the mass 3, the vibrational movements of which being indicated by $h$ and $v$, respectively. Since the center of gravity 6 substantially coincides with the elastic center 7 of the springs, these movements are not or hardly accompanied by tilting movements of the mass. Also for this reason the characteristics of the table satisfy very stringent requirements, as has appeared from extensive experiments.

From FIG. 2B it appears that the mass, as a consequence of a tilting movement M, for instance caused by an asymmetrical loading of the plate 5, assumes an oblique position with as center of rotation the point in which the center of gravity and the elastic center coincide. The center of gravity, therefore, does not deviate. Stop means diagrammatically indicated at 9 are situated at the same height as this common point, so that, under these circumstances, a difference in clearance between these means and the means 3 will not occur. These stop means will, therefore, irrespective of the orientation of the mass 3, engage this mass simultaneously, so that the orientation of the mass will not change during immobilizing, and this orientation will, therefore, also be maintained on releasing these stop means.

A preferred embodiment of the main parts of a vibration suppressing table according to the invention shown in FIGS. 3 and 4. Two longitudinal beams 10 and two transverse beams 11 of the frame are shown therein, both having a U-shaped section as appears from FIG. 4. These beams surround a rectangular aperture 12 within which the upper part of a body constituting the mass 3 is situated. On the webs of these beams three helical springs 4 are mounted as clearly appears from FIG. 4, which springs, as shown in FIG. 3, are situated in the corners of an equilateral triangle. In the corners of an equilateral triangle with the same dimensions which are symmetrically situated between those of the first triangle three dampers 13 are mounted on the web of the beams 10 and 11.

The upper extremity of the helical springs 4 and the damper 13 act on the upper part 14 of the mass or body 3, which is connected to the main mass 3 by means of an intermediate piece 15. The upper end of each spring engages a spring cup 16 supported by the screw thread of a pin 17, the latter extending upwards through a hole in the upper part 14 of the mass, and supporting this upper part by means of a shoulder 18. By rotating the pin 17, the upper part 14, by which the apparatus to be supported is carried, may be adjusted in a horizontal position, and by simultaneously rotating the pins 17 of the three helical springs the whole mass may be positioned higher or lower.

The dampers 13 comprise a cylindrical cup in which a very viscous liquid is provided in which a damper body 19 is submerged, which body is attached to the lower side of the upper part 14 of the mass and leaves some clearance in respect of the walls of the cup 13. By the movement of the body 19 in respect of the cup the viscous liquid is displaced, and the pressures generated thereby in the liquid will cause an attenuating effect. The attenuation degree may be adapted to the local circumstances by an appropriate selection of the viscosity of the viscous liquid. Such a damper has a single structure and may be easily filled.

At the upper side of the upper part 14 of the mass four support lugs 20 are provided on which the plate 5 may be mounted by means of screws 21. As indicated in FIG. 4, an additional table top 2' may be provided across the opening 12, which is provided with apertures for the spring pins and the support lugs 20. Soiling of the underlying parts of the mass is prevented thereby. The upper part 14 of the mass is provided with a cylindrical center bore 22 and with three transverse bores 23 the axes of which include angles of 120°. In two of said bores, 23 supporting arms 24 are provided which are each mounted beneath a spring 4 of the lateral beam 10 as appears from FIG. 3. In the third bore an arm 25 is situated which is attached in the same manner to the transverse beam 11, which arm is provided with an axial bore 26 which is enlarged at its inner end, in which enlarged part a piston 27 is inserted which, by means of a coil spring 28 or a set of disc springs, is coupled with a piston rod 29. By means of a pouch type membrane 30 this piston is sealed in respect of the surrounding wall of the bore.

In the middle of the cavity 22 a second, cylindrical body 31 with a closed bottom and a detachable cover 32 is provided. The internal space of this second body is nearly completely occupied by an insert 33 leaving a narrow passage 34 between its peripheral and upper walls and the inner wall of the body 31, and in the cover 32 an opening 35 communicating with the passage 34 is provided which may be closed by a threaded plug.

The arms 24 and 25 are secured to the body 31 so that the latter is immovably connected to the frame, the cavity 22 and the bores 23 being sufficiently wide for allowing an oscillating movement of the mass 3 and the parts 14 and 15 connected thereto.

In the lateral wall of the body 31 an aperture 36 is provided facing the arm 25 and communicating with the passage 34, and similar apertures 37 are provided symmetrically between the arms 24 and 25, around which apertures flanges 38 are mounted on the outer wall of the body 31, in which flanges pistons 39 are movable, each of which being connected to the flange 38 in question in a sealed way by means of a pouch type membrane 40. The passage 34 is filled with a suitable oil so that, as the rod 29 is pushed inwards, the pressure exerted by the piston 30 is uniformly transferred to the three pistons 39. Since the driving piston 30 and the driven piston 39 are situated near the lower extremity of the passage 34, a complete deaeration is possible, and, moreover, the use of pouch membranes 30 and 40 enables to prevent oil leakage or air penetration completely. The pistons 39 have no metallic contact with the cylinders in question, and may move substantially frictionless.

By means of a cam 41 the driving rod 29 is coupled to an operating handle 42 which is maintained in two stable positions by means of an over-center spring not shown. As this handle is actuated, the rod 29 is pushed inwards and the spring 28 is compressed, the spring force being transferred by the piston 27 on the oil and, subsequently, on the pistons 39.

Each of the pistons 39 is attached to the cover 32 of the body 31 by means of a spring blade 43. In a recess of each piston 39 a ball 44 is provided which slightly protrudes through a hole in the spring blade 43 and is, in this manner, kept inside the piston. Facing each ball 44 a stop pin 45 is provided which is screwed into a threaded hole in the upper part 14 of the mass, and may be locked therein.

After loading the plate 5 the pins 17 are rotated until the plate 5 is again in the horizontal position and at the required height above the table top 2. Thereafter the pins 45 are adjusted by means of clearance gauges (feelers) in such a manner that the interior faces thereof have a definite small distance from the opposite balls 44. As the driving rod 29 is operated, the pistons 39 are uniformly driven outwards, so that the balls 44 simultaneously engage the opposite pins 45, and the body 31 is symmetrically immobilized, thus ensuring that the surface 5 remains horizontal. The plane through the pins 45 extends substantially through the elastic center 7 of the springs 4 and the center of gravity 5 of the mass assembly, so that, as mentioned above, at a slightly oblique orientation of the mass and the plate 5 connected thereto the lateral translations in respect of the pins 45 are as small as possible, the adjustment of said pins 45 thus remaining correct. Moreover unwanted tilting forces and displacements caused by tightening the locking pistons 39 are prevented in this manner.

In this manner a vibration suppressing table is obtained which is able to keep away vibrations from a sensitive apparatus in a very efficient manner, and the substantially non-vibrating part thereof may be immobilized very efficiently. It will be clear that the preferred embodiment described may be modified in many ways, and that, more particularly, the stop means may be constructed in many other ways.

I claim:

1. A vibration suppressing table, comprising:

a frame of substantially horizontal extension and having a plurality of legs for placing the frame on a floor or the like, the frame further having a central opening;

a relatively heavy body disposed in said opening and provided with a support plate for an object or objects to be placed on the table, the body further provided in its upper part with a second surface;

a plurality of compression springs, arranged vertically as to resilient action and reaction and in the corners of a regular polygon underneath said second surface, the lower ends of said springs bearing against the frame, the upper ends of said springs bearing against said second surface, there being adjusting means in each corner for individually adjusting the spacing between said second surface and said frame for similar length of the respective springs;

a plurality of vibration damping means means arranged respectively symmetrically between said springs, each damping means having a first and second coacting part, the first part connected to the frame, the second part connected to said body; and said second surface being above the center of gravity of said body, said springs located so that their common elastic center at least approximately coincides with said center of gravity.

2. A table as in claim 1, said body having a central cavity, a second body in said cavity and affixed to said frame, a plurality of stop means symmetrically positioned around a vertical axis that runs through the center of gravity for positioning the body relative to said second body, and hydraulic means in the second body for engaging the stop means and being adjustable to obtain symmetric position arresting of the body relative to the second body.

3. A table as in claim 2, said cavity including a sealed space, the hydraulic means including plural piston and cylinder arrangements, respectively one arrangement for and coacting with each said stop means, the cylinders communicating with the sealed space of and in the central cavity; an actuator piston in a cylinder likewise communicating with said sealed space; and means for operating said actuator piston from the outside.

4. A table as in claim 3, the pistons of said plural arrangements being held on the second body by means of spring blades.

5. Table according to claim 3, the pistons of the plural arrangement each being provided with an axial bore, a ball narrowly received in the bore, the stop means each comprise an adjustable pin being arranged in the body and coaxially to these pistons.

6. Table according to claim 2, said second body being a cylindrical body, arranged coaxial with the main body and being provided with a detachable cover; a coaxial insert attached to the bottom of the second body, said insert defining with the inner wall of the cylinder a narrow annular space and ending at a small distance below the cover, said hydraulic means including a plurality of cylinders, arranged in the wall of the cylindrical body, pistons respectively in said cylinders, respectively for engagement with the stop means when the respective piston is driven radially outwardly; an air escape aperture in the cover; and a conduit for pressurized oil communicating with the annular space.

7. Table according to claim 2, the body having at least two parts, interconnected by means of tensioning bolts, the upper one of said two parts being provided with the cavity and further provided with attaching means for the springs of the plurality, and the damping means of the plurality.

8. A table as in claim 2, the body having access openings to said central cavity; arms in said openings for supporting said second body, the arms being affixed to said frame.

9. Table according to claim 1, characterized in that the springs and the damping means are situated in the corners of an equilateral triangle, said frame being rectangular.

10. Table according to claim 1 and having a top, the body being underneath said top, the top having openings, the body being provided with a plurality of vertically directed supporting lugs extending through corresponding ones of said openings of the table top, being mounted on said lugs.

11. Table according to claim 1, characterized by a plurality of stop means, there being as many stop means as there are springs of the plurality, the stop means each having an axis, said axes defining a plane, the elastic center of the springs being situated substantially in the plane of the axis of these top means.

12. Table according to claim 11, characterized in that the axes of the stop means intersect the vertical axis of the mass substantially in the center of gravity.

13. Table according to claim 6, characterized in that the oil conduit comprises a cylinder directly communicating with the annular space and a piston arranged therein, said piston, by means of a compression spring, being connected to a driving rod, said driving rod being coupled with an operating handle with two stable positions, said handle being provided with a cam or crank.

14. Table according to claim 13, characterized in that the pistons of the plural arrangements are provided with pouch membranes.

* * * * *